United States Patent [19]

Buskens et al.

[11] Patent Number: 5,683,673
[45] Date of Patent: Nov. 4, 1997

[54] PROCESS FOR THE MANUFACTURE OF A ZEOLITE

[75] Inventors: Philip Luc Buskens, Heverlee; Luc Roger Marc Martens, Meise; Georges Marie Karel Mathys, Bierbeek, all of Belgium

[73] Assignee: Exxon Chemical Patents Inc., Houston, Tex.

[21] Appl. No.: 586,842

[22] PCT Filed: Jul. 23, 1994

[86] PCT No.: PCT/EP94/02458

§ 371 Date: May 3, 1996

§ 102(e) Date: May 3, 1996

[87] PCT Pub. No.: WO95/03250

PCT Pub. Date: Feb. 2, 1995

[30] Foreign Application Priority Data

Mar. 31, 1994 [GB] United Kingdom ............... 9406433

[51] Int. Cl.[6] .................................................. C01B 39/02

[52] U.S. Cl. ................... 423/701; 423/705; 423/DIG. 27
[58] Field of Search ..................... 423/701, 705, 423/DIG. 27

[56] References Cited

U.S. PATENT DOCUMENTS

| 3,308,069 | 3/1967 | Wadlinger et al. | 423/DIG. 27 |
| 4,847,055 | 7/1989 | Chu | 423/705 |
| 4,916,097 | 4/1990 | Chu et al. | 502/85 |
| 4,923,690 | 5/1990 | Valyocsik et al. | 423/705 |

FOREIGN PATENT DOCUMENTS

| 158491 | 10/1985 | European Pat. Off. |
| 93-08125 | 4/1993 | WIPO |

Primary Examiner—Mark L. Bell
Assistant Examiner—David Sample
Attorney, Agent, or Firm—Edward F. Sherer

[57] ABSTRACT

In the manufacture of Beta zeolite, good yields result from a high ethene pressure, advantageously accompanied by synthesis gel ageing and low aluminium content.

21 Claims, No Drawings

PROCESS FOR THE MANUFACTURE OF A ZEOLITE

This application is a 371 of PCT/EP94/02458.

This invention relates to a process for the manufacture of a zeolite, especially to one suitable for use as an absorbent or catalyst, to the zeolite produced by the process, and to organic reactions, especially oxidations of hydrocarbons, catalysed thereby.

Zeolite Beta is a large pore, high silica zeolite material first described in 1967, in U.S. Pat. No. 3,308,069. Because of its large pore size, based on 12-membered rings, it is useful as a catalyst for reactions involving larger organic molecules than can be accommodated in the pore of the more commonly used ZSM-5, 10-membered ring, zeolite catalysts.

The previously proposed processes for the manufacture of the catalyst have all employed synthesis mixtures containing cations of an alkali metal; indeed, in an article by Camblor et al, Zeolites, 1991, 202 to 210, it is suggested that the presence of alkali metal cations is essential for the formation of the zeolite. Certainly, in the existing processes yields in the absence of alkali metal cations are very low.

The presence of alkali metal cations in the synthesis mixture is, however, disadvantageous, especially when the zeolite is to be used as an acidic catalyst, since any necessary post-calcination treatment is made longer by the presence of substantial alkali metal concentrations.

The present invention is based on the observation that if ethene is present in contact with a Beta-forming synthesis mixture during the hydrothermal treatment Beta zeolite is obtained in good yields.

The present invention accordingly provides in a first aspect a process for the manufacture of a Beta zeolite in which at least a part of a hydrothermal treatment of a Beta zeolite-forming synthesis mixture is carried out under an ethene-containing atmosphere at a pressure of at least 20 bar and advantageously under an ethene partial pressure of at least 5 bar.

In a second aspect, the invention provides a process for the manufacture of a Beta zeolite in which at least a part of a hydrothermal treatment of a Beta zeolite forming synthesis mixture is carried out in the presence of at least 0.1 mole of ethene per mole of tetraethylammonium cations. Advantageously, the mole ratio of ethene:tetraethylammonium is in the range 0.1 to 1:1.

As a Beta forming synthesis mixture, there is typically used a mixture comprising a source of silicon, a source of aluminium, water, and a source of tetraethylammonium cations. The aluminium may, however, be replaced wholly or in part by other cations, for example gallium, boron, or iron.

The synthesis mixture is advantageously substantially free from alkali metal cations; by substantially free is meant the absence of more alkali metal than is inevitably present in commercial supplies of the essential components. If alkali metal ions, e.g., sodium or potassium ions, are present, they are advantageously present in a molar proportion of $SiO_2:M^+$ of 1: at most 0.5.

Advantageously, the synthesis mixture has a molar composition within the following ranges: $SiO_2$ (1); $Al_2O_3$ (0.0005 to 0.1); $H_2O$ (10 to 100) and TEAOH (0.01 to 1).

Advantageously, the Si:Al molar ratio is within the range of from 50 to 200:1.

Preferred sources of the components are: for silicon, colloidal silica, advantageously a colloidal silica substantially free from alkali metal cations, or a tetraalkylammonium orthosilicate; and for aluminium, aluminium powder. If the aluminium is replaced by other cations, suitable sources are, for example; gallium nitrate or oxide, boric acid or an alkoxide thereof, e.g., $B(OC_2H_5)_3$, or ferric nitrate. The tetraethyl ammonium cations are advantageously provided by TEAOH.

If desired or required to assist dissolution of any reactants, hydrogen peroxide may be present in the synthesis mixture.

Advantageously, especially if it contains hydrogen peroxide, the synthesis mixture is aged between its formation and the hydrothermal treatment. Ageing may be carried out at room temperature or at elevated temperatures, for example at from 60° to 90° C., advantageously about 70° C., the ageing time being from 2 to 24 hours, depending inversely on the temperature. A preferred ageing treatment comprises initial room temperature ageing for from 12 to 18 hours, followed by elevated temperature ageing, e.g., at 70° C., for from 2 to 4 hours.

Elevated temperature ageing also causes evaporation of water from the synthesis mixture, thereby producing a synthesis gel of a concentration advantageous for hydrothermal treatment. If desired, or required, the aged gel may be diluted before treatment, e.g., with ethanol. If ethanol is added, it is advantageously present in the synthesis mixture subjected to hydrothermal treatment in a proportion of at most 2 moles per mole of $SiO_2$.

The synthesis mixture, preferably aged, is advantageously subjected to hydrothermal treatment at a temperature within the range of from 120° C. to 200° C., preferably from 130° C. to 150° C., under the pressure regime as indicated above, advantageously for a time in the range of from 1 hour to 30 days, preferably from 6 days to 15 days, until crystals are formed. Hydrothermal treatment is advantageously effected in an autoclave.

While not wishing to be bound by any theory, it is believed that under the conditions prevailing under the hydrothermal treatment tetraethylammonium ions decompose and are unavailable to form a template effective in zeolite formation. By carrying out the treatment in the presence of ethene, a decomposition product, the equilibrium of the decomposition reaction is displaced and more tetraethylammonium ions remain available to act as templates.

In any event, by carrying out at least part of the hydrothermal treatment in the presence of ethene, a higher zeolite yield may be obtained or a lower proportion of tetraethylammonium ions may be included in the synthesis mixture. Advantageously, ethene is present in the reaction vessel from the commencement of the hydrothermal treatment.

Advantageously, the ethene partial pressure is at least 5 bar, preferably at least 20 bar, and most preferably at least 30 bar, for at least a part of the period of hydrothermal treatment. Also, advantageously, the total pressure is at least 30 bar, and preferably at least 40 bar. Advantageously, the ethene partial pressure is at least 80%, preferably at least 90%, of the total pressure.

After crystallization has taken place, the synthesis mixture is cooled, and the crystals are separated from the mother liquor, washed and dried.

To eliminate the organic base from the crystals, they are advantageously then heated to from 200° to 600° C., preferably about 550° C., in air, for from 1 to 72 hours, preferably about 12 hours.

The resulting calcined product may either be used as such or subjected to further treatment e.g., by acid, for example, HCl, or by cation exchange, e.g., to introduce nickel. The product may be post-treated, as by steaming.

The Beta zeolite produced by the process of the invention may be highly crystalline and has the typical Beta zeolite IR absorption bands at 575 and 525 cm$^{-1}$ and X-ray diffraction spectrum.

The zeolite produced according to the invention is useful as a catalyst in all reactions where an acidic catalyst is effective, especially in the production and conversion of organic compounds, for example cracking, hydrocracking, dewaxing, isomerization (including e.g., olefin bond isomerization and skeletal isomerization e.g., of butene), oligomerization, polymerization, alkylation, dealkylation, hydrogenation, dehydrogenation, dehydration, cyclization and aromatization. The present invention therefore provides a process for the production or conversion of an organic compound comprising the use of a zeolite catalyst prepared in accordance with the invention. The zeolite can also be used (either as initially prepared or in a modified form) in a selective adsorption process e.g., a separation or purification.

The following Example illustrates the invention.

EXAMPLE 1

256 g of distilled $H_2O$ were cooled to 5° C., and 103 ml of $H_2O_2$ (35 wt % in $H_2O$) were added. The resulting solution was stirred for 3 hours at 5° C.

The aluminium source, 0.3859 g Al powder, and 366 g of the template, TEAOH (40% in $H_2O$), were combined in a beaker, covered to prevent evaporation, and heated at 80° C. for 2 hours. After dissolution of aluminium, 183 ml of distilled water were added. The resulting solution was cooled to 5° C.

The two solutions were mixed, and the resulting solution stirred at 5° C. for another hour. Afterwards, 61 g of colloidal silica (Aerosil, 200 m$^2$/g) are added, and stirred for 18 hours at room temperature. A gel with the following molar composition is thus obtained; $SiO_2$:1; $TEA_2O$:0.49; $Al_2O_3$:0.007; $H_2O$:28.

Subsequently, the solution was kept at 70° C. for 2 hours, and then allowed to cool to room temperature. Before transferring the solution to a 1000 ml, ptfe-lined, stainless steel autoclave, 61 ml of ethanol were added. The synthesis mixture occupied about 95% of the volume. Gas phase analysis showed a high ethene content in the head-space.

The autoclave was kept at 140° C. without agitation. After 11 days, pressure had risen to 50 bar. The crystals were separated from the mother liquor and washed by centrifugation at 13,000 rpm. After drying at 60° C., the organic template was removed from the zeolite pores by calcination at 550° C. in air for 12 hours.

X-ray diffraction study of the product before calcination showed that it had pure Zeolite Beta crystal structure. The yield, expressed as the weight of solids after calcination as a proportion of the total of $SiO_2$ and $Al_2O_3$ in the gel, was 42%. The Si:Al ratio ($^{27}$Al-NMR) was 36:1.

We claim:

1. A process for the manufacture of Beta zeolite comprising:
   (a) Providing a Beta Zeolite-forming synthesis mixture; and
   (b) Hydrothermally treating said Beta Zeolite-forming synthesis mixture to produce Beta Zeolite;

wherein at least a portion of the hydrothermal treatment of step (b) is carried out under an ethene-containing atmosphere at a total pressure of at least 20 bar.

2. The process of claim 1 wherein at least part of the hydrothermal treatment is carried out under an ethene partial pressure of at least 5 bar.

3. The process of claim 2 wherein the ethene partial pressure is at least 20 bar.

4. The process of claim 3 wherein the ethene partial pressure is at least 30 bar.

5. The process of claim 1 carried out at a total pressure of at least 30 bar.

6. The process of claim 1 wherein the synthesis mixture comprises water, a source of silicon, a source of aluminium, and a source of tetraethylammonium ions.

7. The process of claim 6 wherein the molar composition of the synthesis mixture is within the following ranges: $SiO_2$ (1); $Al_2O_3$ (0.0005 to 0.1); $H_2O$ (10 to 100); TEAOH (0.01 to 1).

8. The process of claim 1 wherein the synthesis mixture contains colloidal silica.

9. The process of claim 8 wherein the colloidal silica is substantially alkali metal-free.

10. The process of claim 1 wherein the synthesis mixture contains a tetraalkylorthosilicate.

11. The process of claim 1 wherein the synthesis mixture contains hydrogen peroxide.

12. The process of claim 1 wherein the synthesis mixture is aged between its formation and the hydrothermal treatment.

13. The process of claim 12 wherein at least part of the ageing is carried out at room temperature.

14. The process of claim 2 wherein at least part of the ageing is carried out at an elevated temperature.

15. The process of claim 1 wherein the synthesis mixture subjected to hydrothermal treatment contains ethanol, in a proportion of at most 2 moles per mole of $SiO_2$.

16. The process of claim 1 wherein hydrothermal treatment is carried out at a temperature within the range of from 120° C. to 200° C.

17. The process of claim 1 wherein hydrothermal treatment is carried out for from 1 hour to 30 days.

18. The process of claim 4 wherein after hydrothermal treatment the resulting Beta Zeolite is recovered and calcined in air at from 200° to 600° C., for from 1 to 72 hours.

19. The process of claim 18 wherein the calcined Beta Zeolite is treated with an acid or a base, or is steamed.

20. A process for the manufacture of Beta Zeolite comprising:
   (a) Providing a Beta Zeolite-forming synthesis mixture containing tetraethylammonium cations; and
   (b) Hydrothermally treating said Beta Zeolite forming synthesis mixture to produce Beta Zeolite;

wherein at least a portion of the hydrothermal treatment of step (b) is carried out in the presence 0.1 mole of ethene per mole of tetraethylammonium cation.

21. The process of claim 20 wherein the mole ratio of ethene:tetraethylammonium is in the range 0.1 to 1:1.

* * * * *